United States Patent
Maddouri et al.

(10) Patent No.: US 12,254,057 B1
(45) Date of Patent: Mar. 18, 2025

(54) INTELLIGENT REDIRECTS

(71) Applicant: the dtx company, New York, NY (US)

(72) Inventors: Jizel Maddouri, New York, NY (US); Jacob M. Skinner, New York, NY (US); Matthew Ritonia, Arlington, VA (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 18/953,470

(22) Filed: Nov. 20, 2024

(51) Int. Cl.
*G06F 16/955* (2019.01)
*G06K 19/06* (2006.01)

(52) U.S. Cl.
CPC ... *G06F 16/9554* (2019.01); *G06K 19/06037* (2013.01)

(58) Field of Classification Search
CPC ............ G06F 16/9554; G06K 19/06037
USPC .................................. 235/494, 375
See application file for complete search history.

(56) References Cited

U.S. PATENT DOCUMENTS

| | | |
|---|---|---|
| 7,467,356 B2 | 12/2008 | Gettman et al. |
| 7,504,949 B1 | 3/2009 | Rouaix et al. |
| D697,529 S | 1/2014 | Judge Cornish |
| D702,723 S | 4/2014 | Abratowski et al. |
| D723,104 S | 2/2015 | Cho et al. |
| D769,296 S | 10/2016 | Grecia |
| 9,704,081 B2 | 7/2017 | Tanaka et al. |
| 9,936,249 B1 | 4/2018 | Nelson et al. |
| D826,955 S | 8/2018 | Grecia |
| D857,054 S | 8/2019 | Grecia |
| 10,375,060 B1 * | 8/2019 | Graves ................. H04W 12/77 |
| D860,256 S | 9/2019 | Stephen |
| 10,460,138 B2 | 10/2019 | Barnum |
| 10,803,432 B1 | 10/2020 | Miles |
| D905,743 S | 12/2020 | Jewitt |
| 10,963,868 B1 | 3/2021 | McCauley et al. |
| D918,936 S | 5/2021 | Walsh et al. |
| 11,010,650 B1 | 5/2021 | Devlin et al. |
| 11,106,753 B1 | 8/2021 | Fowler et al. |
| 11,120,095 B2 | 9/2021 | Askarian et al. |
| D936,699 S | 11/2021 | McDonald |

(Continued)

OTHER PUBLICATIONS

Inderscience Enterprises Ltd., Wickramasinghe et al., "A Mathematical Model for Computational Aesthetics," pp. 310-324, Jan. 15, 2011, Int. J. Computational Vision and Robotics, 2010 Vol. 1, No. 3.

(Continued)

*Primary Examiner* — Paultep Savusdiphol
(74) *Attorney, Agent, or Firm* — Weiss & Arons LLP (57) ABSTRACT

An intelligent redirect system for a quick response ("QR") code derived unified resource location ("URL"). The system may include a plurality of website variants. Each website variant may present a landing page. Each landing page may correspond to the QR code. A backend server may receive the plurality of website variants from a user. A plurality of scans may be received from a plurality of scanners. A preconfigured algorithm may determine which website variant to direct to each of the plurality of scanners. A processor may derive scanner behavior for each website variant. An artificial intelligence ("AI") model may build a new distribution pattern based on the scanner behavior. The new distribution pattern may be used to direct a website variant to the scanner.

18 Claims, 8 Drawing Sheets

(56) References Cited

U.S. PATENT DOCUMENTS

| | | | |
|---|---|---|---|
| 11,182,768 | B2 | 11/2021 | Fowler et al. |
| D939,570 | S | 12/2021 | Dye et al. |
| 11,194,981 | B2 | 12/2021 | Filter et al. |
| 11,205,105 | B1 | 12/2021 | Devlin et al. |
| 11,206,432 | B1 | 12/2021 | Fowler et al. |
| 11,334,779 | B1 | 5/2022 | Schwarzberg |
| 11,347,823 | B2 | 5/2022 | Askarian et al. |
| 11,379,820 | B2 | 7/2022 | Mossoba et al. |
| D962,965 | S | 9/2022 | Shing et al. |
| D962,966 | S | 9/2022 | Shing et al. |
| 11,797,810 | B2 | 10/2023 | Devlin et al. |
| 2002/0032791 | A1 | 3/2002 | Isherwood et al. |
| 2002/0139839 | A1 | 10/2002 | Catan |
| 2004/0123223 | A1 | 6/2004 | Halford |
| 2004/0246529 | A1 | 12/2004 | Pruden et al. |
| 2006/0196950 | A1 | 9/2006 | Kiliccote |
| 2006/0215931 | A1 | 9/2006 | Shimomukai |
| 2007/0035327 | A1 | 2/2007 | Baeckler et al. |
| 2007/0286455 | A1 | 12/2007 | Bradley |
| 2010/0128921 | A1 | 5/2010 | Alattar et al. |
| 2011/0290882 | A1 | 12/2011 | Gu et al. |
| 2012/0206648 | A1 | 8/2012 | Casagrande et al. |
| 2012/0256732 | A1 | 10/2012 | McAllister |
| 2012/0278465 | A1 | 11/2012 | Johnson |
| 2013/0112760 | A1 | 5/2013 | Schory et al. |
| 2013/0126599 | A1* | 5/2013 | Soske .............. G06Q 30/02 235/375 |
| 2013/0197992 | A1 | 8/2013 | Bao |
| 2013/0215475 | A1 | 8/2013 | Noguchi |
| 2013/0228624 | A1 | 9/2013 | Byrd et al. |
| 2013/0297430 | A1 | 11/2013 | Soergel |
| 2014/0001253 | A1 | 1/2014 | Smith |
| 2014/0095461 | A1 | 4/2014 | Burt |
| 2015/0014417 | A1 | 1/2015 | Finlow-Bates et al. |
| 2015/0048169 | A1 | 2/2015 | Doberschutz |
| 2015/0099946 | A1 | 4/2015 | Sahin |
| 2015/0262221 | A1 | 9/2015 | Nakano et al. |
| 2015/0324678 | A1 | 11/2015 | Simske et al. |
| 2016/0148083 | A1 | 5/2016 | Osborne et al. |
| 2016/0162767 | A1 | 6/2016 | Ito et al. |
| 2016/0189016 | A1 | 6/2016 | Windmueller et al. |
| 2016/0247423 | A1 | 8/2016 | Hohl et al. |
| 2016/0364825 | A1 | 12/2016 | Pan |
| 2017/0264608 | A1 | 9/2017 | Moore et al. |
| 2017/0300854 | A1 | 10/2017 | Harcar et al. |
| 2018/0365330 | A1 | 12/2018 | Lin et al. |
| 2019/0089757 | A1 | 3/2019 | Sorensen et al. |
| 2019/0138721 | A1 | 5/2019 | Wojnowicz et al. |
| 2019/0221293 | A1 | 7/2019 | Zhang |
| 2019/0234975 | A1 | 8/2019 | Pothini et al. |
| 2019/0258814 | A1 | 8/2019 | Heeter |
| 2019/0281030 | A1 | 9/2019 | Isaacson et al. |
| 2019/0281124 | A1 | 9/2019 | Lim et al. |
| 2020/0193252 | A1* | 6/2020 | Guinard .............. G06K 19/145 |
| 2020/0356080 | A1 | 11/2020 | Principato |
| 2020/0356083 | A1 | 11/2020 | Principato |
| 2020/0356741 | A1 | 11/2020 | Principato |
| 2020/0394699 | A1 | 12/2020 | Mueller |
| 2021/0042730 | A1 | 2/2021 | Lee |
| 2021/0056541 | A1 | 2/2021 | Kim |
| 2021/0217006 | A1 | 7/2021 | Ragavan et al. |
| 2021/0271803 | A1 | 9/2021 | Seymour et al. |
| 2021/0287202 | A1 | 9/2021 | Fowler et al. |
| 2021/0334490 | A1 | 10/2021 | Luk et al. |
| 2021/0357715 | A1 | 11/2021 | Schimke et al. |
| 2021/0377263 | A1 | 12/2021 | Law |
| 2022/0215190 | A1 | 7/2022 | Cohen et al. |
| 2022/0253811 | A1 | 8/2022 | Fowler et al. |
| 2022/0374664 | A1 | 11/2022 | Zhou et al. |
| 2024/0095482 | A1* | 3/2024 | Williams ......... G06K 19/06037 |

OTHER PUBLICATIONS

Elsevier, Maity et al., "A Computational Model to Predict Aesthetic Quality of Text Elements of GUI," pp. 152-159, Dec. 2016, Procedia Computer Science 84 (2016), www.sciencedirect.com.

AI Shack, Utkarsh Sinha, "Scanning QR Codes," 2010, https://aishack.in/tutorials/scanning-qr-codes-1/.

AIA Vision Online, "The Most Common Causes of Unreadable Barcodes," Apr. 15, 2015, https://www.visiononline.org/vision-resources-details.cfm?content id=5404.

Workwithcolor.com, "Color Properties/Terminology," Retrieved on Jun. 8, 2020, http://www.workwithcolor.com/color-properties-definitions-0101.htm.

The Eurographics Association, Florian Hoenig, "Defining Computational Aesthetics," pp. 13-18, 2005, Computational Aesthetics in Graphics, Visualization and Imaging (2005), www.diglib.eg.org.

Datagenetics, "Wounded QR Codes," Nov. 2013, http://datagenetics.com/blog/november12013/index.html.

QR Code Monkey, "6 Reasons Why Your QR Code Is Not Working," Retrieved on Jun. 9, 2020, https://www.qrcode-monkey.com/6-reasons-why-your-qr-code-is-not- working.

Techspot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What Is A Qr Code," Retrieved on Jun. 8, 2020, https://www.keyence.com/ss/products/auto_id/barcode lecture/basic 2d/gr/.

Wikimedia Foundation, Inc., "QR Code," Retrieved on Jun. 3, 2020, https://en.wikipedia. org/wiki/QR code.

Wikimedia Foundation, Inc., Walter Tuveli, "QR Code—Structure," 2012, https://en.wikipedia.org/wiki/QR code#/media/File:ORCode-2-Structure.png.

U.S. Patent and Trademark, Non-Final Office Action in U.S. Appl. No. 17/078,622, filed Dec. 22, 2020.

U.S. Patent and Trademark, Non-Final Office Action in U.S. Appl. No. 16/988,678, filed May 11, 2021.

App No. PCT/US2021/44963 International Search Report and Written Opinion of the International Searching Authority, Nov. 3, 2021.

Wikimedia Foundation, Inc., "ShotCode," https://en.wikipedia.org/wiki/ShotCode#searchInput, Retrieved on Aug. 6, 2021.

Www.medium.com, Punit Pathak, "ETL-Understanding It and Effectively Using It," https://medium.com/hashmapinc/etl-understanding-it-and-effectively-using-it-f827a5b3e54d, Jan. 7, 2019.

Strathmore University (Nairobi, Kenya), Kizi Dimira Othuon, "Improving Customer Experience Using an Android Barcode Reader Application," https://su- plus.strathmore.edu/bitstream/handle/11071/5978/Improving%20customer%20shopping%20 experience%20u 62 620Android%20barcode%20reader%20application.pdf?sequenc e=1 &isAllowed=y, Apr. 2018.

Horrigan, Aidan, "Mr. WHS 2020," www.westboroughtv.org, https://westboroughty.org/mr-whs-2020-2/, Jun. 12, 2020.

Wa, Izakaya, "QR codes for the dinner menu and lunch menu at Memorial!" www.facebook.com, https://m.facebook.com/196433773873837/posts/gr-codes-for-the-dinner-menu-and-lung 80486571, Jul. 24, 2020.

"StockX TV Spot, 'Flowcode: Never Sold Out,'" www.ispot.tv, https://www.ispot.tv/ad/nVly/stockx-flowcode-never-sold-out. Mar. 27, 2020.

"#FitForTheFrontline Challenge Unites Nation's Top Medical Centers to Support Frontline Healthcare Workers," www.nyp.org, https://www.nvp.org/news/fit-for-the-frontline-challenge, May 28, 2020.

* cited by examiner

{ } IntelligentRedirectsExperimentData    bundles/v1/bundle.proto

```
message IntelligentRedirectsExperimentData {
    string default_asset_key = 1;
}
```

502

{ } Experiment    bundles/v1/bundle.proto

```
message Experiment {
    ExperimentType experiment_type = 1;
    oneof value {
        IntelligentRedirectsExperimentData IntelligentRedirects_experiment_data = 2;
    }
}
```

504

ExperimentType    bundles/v1/bundle.proto

```
enum Experiment Type {
    EXPERIMENT_TYPE_UNSPECIFIED = 0;
    EXPERIMENT_TYPE_INTELLIGENTREDIRECTS = 1;
}
```

```
"links":[
    {
     "source": "code_batch-1",
     "destination": "experiment",
     "source_anchor": "right",
     "destination_anchor": "left"
    },
    {
     "source": "experiment",
     "destination": "landing_page-a-1"
    },
    {
     "source": "experiment",
     "destination": "landing_page-a-2"
    },
    {
     "source": "landing_page-a-1",
     "destination": "page_form_1", "source_anchor": "conversion",
     "destination_anchor": "left"
    },
    {
     "source": "landing_page-a-2",
     "destination": "page_form_2"
     "source_anchor": "conversion",
     "destination_anchor": "left"
    },
]
```

FIG. 6

```
"config":{
    "experiment":{
      "experiment_type": "EXPERIMENT_TYPE_INTELLIGENTREDIRECTS",
      "IntelligentRedirects_experiment_data":{
        "default_asset_key": "landing_page-a-1"
      }
  },
  "landing_page-a-1":{
    "tertiaryText":[
        {
             "text": "Description - Landing Page a 1 tertiary text"
        }
    ]
    "ctaText": "CTA text landing page a 1",
    "primaryText": "primary text landing page a 1",
    "secondaryText":{
        "text": "Subtitle - Landing Page a 1 secondary text"
    }
  }
  "landing_page-a-2":{
    "tertiaryText":[
        {
             "text": "Description - Landing Page a 2 tartiary text"
        }
    ],
    "ctaText": "CTA text landing page a 2",
    "primaryText": "primary text landing page a 2",
    "secondaryText":{
        "text": "Subtitle - Landing Page a 2 secondary text"
    }
  }
  "page_form_1":{
    "type": "ASSET_TYPE_PAGE_V2",
    "templateID": "162a64c2-43c2-4996-bc41-9eb54ba9f822",
    "config": {}
    "isCustomizable": True
  }
  "page_form_2":{
    "type": "ASSET_TYPE_PAGE_V2",
    "templateID": "559d7bd2-b15a-4a50-9db8-8c8c634b78d5",
    "config": {}
    "isCustomizable": True
  },
}
```

INTELLIGENT REDIRECTS

FIELD OF TECHNOLOGY

Aspects of the disclosure relate to technology involving quick-response ("QR") codes.

BACKGROUND

QR codes provide businesses with a fast and efficient medium for connecting with consumers. Instructions, such as unified resource locators ("URL") contact information and other alphanumeric information may be encoded in QR codes. Businesses may leverage QR codes to guide consumers to a desired destination (real or virtual) where the customers can access products or services provided by the business. However, conventional QR codes guide consumers to a single destination.

Some consumers scan the QR code and expect a different URL than other consumers. However, each QR code is typically associated with a single URL. As such, the consumers scanning the QR code are guided to the same URL.

Therefore, it would be desirable to create a method that associates a QR code with a plurality of URLs and websites.

It would be further desirable for the method to select a URL and website from among a plurality of URLs and websites.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Apparatus, methods and systems for intelligent redirects are provided. For the purpose of this application, the term intelligent redirects should be understood to refer to a QR code with a plurality of website variants.

Methods may include receiving a plurality of website variants from a user. The plurality of website variants may include 3, 4, 5, 10, 15, 20 or any other suitable number of website variants. Each of the website variants may be an individual website. For example, there may be 3, 4, 5, 10, 15, 20 or any other suitable number of websites. Each of the website variants may be a portion of a website. Each website variant may present an alternative landing page. The alternative landing page may be identifiable using a unified resource locator ("URL"). It should be noted that the alternative landing pages may also be referred to individually as a target landing page or a target landing URL.

Each of the plurality of website variants may be associated with a quick response ("QR") code. The QR code may be an intelligent redirect QR code. The QR code may navigate a scanner to a website variant and associated landing page. For the purposes of this application, a scanner may be understood to refer to an individual that scans the QR code. Additionally, a landing page, for the purposes of this application, may be understood to refer to the first page to which a scanner is directed in response to scanning the QR code. A single website variant may be selected, using an artificial intelligence ("AI") model, as a target landing URL. The AI model may select a single website variant and associated target landing URL based on a preconfigured algorithm.

Methods, according to the disclosure, may further include receiving a plurality of scans of the QR code. One or more scanners may scan the QR code using a scanning device. The scanning device may be a mobile device, a smartphone, a computer, a smartwatch and/or any other suitable scanning device. The scanner may use a camera located on the scanning device to scan the QR code.

Upon scanning the QR code, the scan may be transmitted to a backend server and/or backend system. The backend server and/or backend system may be associated with the QR code. The backend server may be associated with the plurality of website variants. The backend server may determine if the QR code is an intelligent redirect QR code. Upon determination of the intelligent redirect QR code, the backend server may request a recommended website variant from the AI engine associated with the QR code. The AI engine may allocate a website variant and associated target landing page from the plurality of website variants. The AI engine may allocate the website variant and associated target landing page based on a preconfigured algorithm.

Each scan of the intelligent redirect QR code may navigate a scanner to one of the website variants. A scanner may be navigated to one of the website variants based on a preconfigured algorithm. A scanner may be directed to a target landing page, corresponding to the determined website variant, on the scanning device. The target landing page may include a component named: call to action ("CTA"). The CTA may be embedded in a button on the target landing page. When the button is tapped or selected, the button and embedded CTA may assist in directing a conversion page to the scanner.

Users, also referred to as platform users, may construct a conversion page for each website variant. For the purposes of this application, a conversion page may be understood to refer to a form with contact information, a purchase action or any other suitable conversion page. The conversion page may be retrieved when the button on the target landing page, associated with the CTA component, is selected or tapped. Users may create a customized suite from the conversion page. For purposes of the application, a suite may be understood to refer to an instance of a bundle. A bundle, for purposes of the application, may be understood to refer to a collection of asset types that fit a specific use case. A bundle may be understood to refer to a template, while a suite may be understood to refer to a collection of actual assets.

The backend server may direct the scanner to the allocated target landing page. When a scanner is directed to the target landing page, or any other suitable page, a Page View event may occur. For the purposes of this application, a Page View event may be considered an event in which a scanner is presented with an intelligent redirect page. It should be noted that an intelligent redirect page may include a target landing page, a conversion page and/or any other suitable intelligent redirect page.

The scanner may select or tap the button, associated with the CTA, that may direct the scanner to a conversion page. The scanner may have performed a second Page View action upon being directed to the conversion page. The scanner may perform one or more events on the conversion page. Events may include an exit event, an interaction event, a conversion event and/or any other suitable event.

An abandon event may refer to an action in which the scanner ensures there will not be a completion of the conversion action. Such an action may include exiting the conversion page and/or performing any other suitable action.

A conversion action may refer to a successful user input submission on a conversion page. A conversion action may be an action performed by a user that yields a conversion. For example, a conversion of a form conversion page may include a scanner selecting submit. Submission of the form may be considered a conversion action.

An interaction action may refer to an action that is distinct from an abandon event and a conversion action. Such an action may include filling out text in a form field, tapping a button and/or performing any other suitable actions.

Such events and/or actions may include scanner behavior. The AI engine may retrieve the scanner behavior. The AI engine may retrieve additional scanner behavior. Additional scanner behavior may include data about the scanner. Data about the scanner may include an age, a location of the scanner, background history of the scanner, including purchases, and/or any other suitable data.

Methods may further include deriving scanner behavior for each of the website variants. When the target landing page is directed to the scanner, scanner behavior may be derived. Scanner behavior may include events performed by the scanner. Scanner behavior may include a Page Views, interaction events, abandon events, conversion actions and/or any other suitable behavior. The ML engine may retrieve additional scanner behavior. Additional scanner behavior may include data about the scanner. Data about the scanner may include an age of the scanner, a location of the scanner, background history of the scanner and/or any other suitable data.

Scanner behavior may include a time of day the QR code has been scanned. The time of day the QR has been scanned may have an affect on which event or action a scanner may perform. The QR code may be scanned in the morning. The target landing page may present an ad for a breakfast special. As such, the scanner may perform a conversion on the target landing page.

The QR code may be scanned at 12:00 μm. The target landing page may be an ad for a breakfast special. As such, the scanner may exit the target landing page. The QR code may be scanned in the evening. The target landing page may be an ad for a breakfast special. Again, the scanner may exit the target landing page.

Scanner behavior may further include a season during which the QR code has been scanned. The QR code may have been scanned in the winter. The target landing page may be an ad for heaters. As such, the scanner behavior may include a conversion. The QR code may have been scanned in the summer. The target landing page may be an ad for heaters. As such, the scanner behavior may include an abandon event. The QR code may have been scanned during a holiday season. The target landing page may be an ad for a sale regarding the holiday. As such, the scanner behavior may include a conversion action.

Scanner behavior may include an event at which the code has been scanned. Events may include a baseball game, a soccer game, a rally or any other suitable event. The target landing page, and associated website variant, may directly relate to the event. For example, the target landing page may be an ad for refreshments at the event. As such, the scanner may perform purchase the refreshments, thereby performing a conversion action.

Scanner behavior may further include the location of the scanner when scanning the QR code. A global positioning system ("GPS"), located on the scanner's device, may provide the system with the location of the scanner. The QR code may have been scanned in a hot climate. The target landing page may be an ad for heaters. As such, the scanner may exit the target landing page. The QR code may have been scanned in a cold climate. The target landing page may be an ad for heaters. As such, the scanner may perform a conversion action and purchase the heaters.

Methods may further include using the artificial intelligence ("AI") engine to determine a new distribution pattern. A distribution pattern, for the purposes of this application, may be understood to refer to the pattern by which the website variants may be allocated. The scanner behavior may be aggregated. The new distribution pattern may be based on the aggregated scanner behavior. The new distribution pattern may be built using the artificial intelligence ("AI") engine. The AI engine may aggregate the scanner behavior with a conversion rate for each website variant. The AI engine may aggregate the scanner behavior using a message brokering system. The AI engine may aggregate the scanner behavior using a data streaming system.

The distribution pattern may include the preconfigured algorithm. The AI engine may determine which website variant has the highest rate of conversion. The AI engine may distribute the website variants according to the website variants that have the highest level of conversion. The AI engine may reconfigure the algorithm based on the distribution pattern. The AI engine may dynamically reconfigure the algorithm.

Methods may include directing the scanner to a specific website variant based on the new distribution pattern as determined by the AI engine. The AI model may determine a rate of conversion for each of the website variants. The AI model may generate the new distribution pattern to direct a single website variant to each scanner.

In some embodiments, the new distribution pattern may be used to reconfigure the algorithm. The new distribution pattern may be used to transmit a specific website variant to a scanner based on scanner behavior. Scanner behavior may include a time the QR code was scanned, a location where the QR code was scanned, an event at which the QR code was scanned, a season during which the QR code was scanned or any other suitable scanner behavior or parameter. The scanner may be directed to a specific website variant based on the reconfigured algorithm. In other embodiments, the AI engine may transmit a specific website variant based on the new distribution pattern.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

Figure 1:
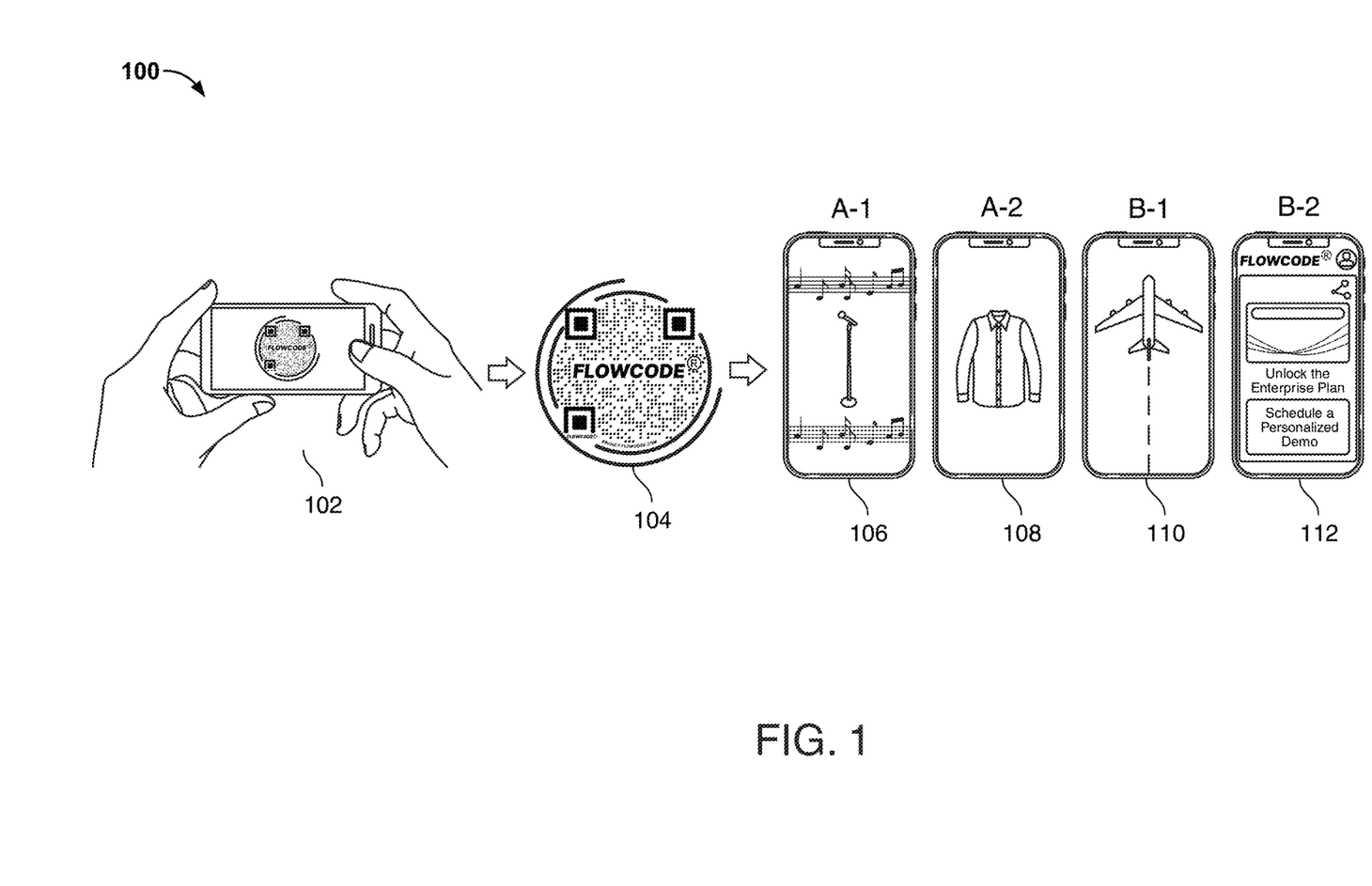
FIG. 1 shows an illustrative flow chart in accordance with principles of the disclosure.

FIG. 1 shows flow diagram 100. Flow diagram 100 shows the process of scanning Flowcode® 104. A scanner may use mobile device 102 to scan Flowcode® 104. Flowcode® 104 may be a QR code. Flowcode® 104 may be an intelligent redirect code. Flowcode® 104 may correspond to a plurality of website variants. Each of the plurality of website variants may present alternative landing pages. The plurality of alternative landing pages may include landing pages 106, 108, 110 and 112. The plurality of alternative landing pages may have been received from a user.

Each intelligent redirect QR code may correspond to a plurality of website variants. The website variants may be received from the user. The user may use the intelligent redirect system. The user may create a suite with multiple variants for an intelligent redirect QR code. The user may select landing pages 106, 108, 110 and 112 along with associated websites, for retrieval when an intelligent redirect QR code is scanned. Each of the website variants may have a different corresponding landing page. Each scanner scanning the QR code may be directed to a landing page and associated website variant. A scanner may be directed to a specific landing page and associated website variant based on a preconfigured algorithm.

Figure 2:
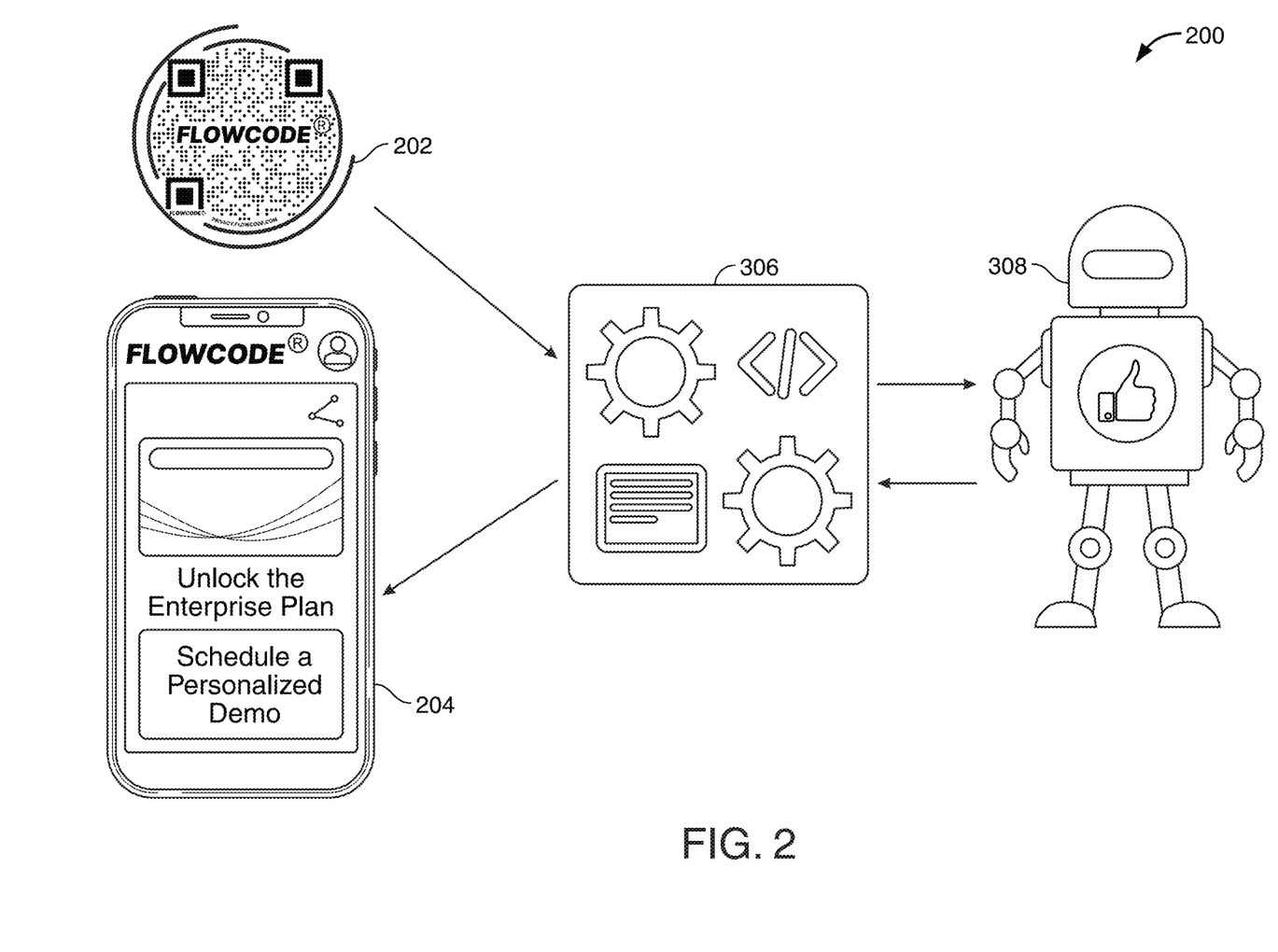
FIG. 2 shows an illustrative flow chart in accordance with principles of the disclosure.

FIG. 2 shows another flow diagram. Flow diagram 200 shows the backend of a scanning of QR code 202. QR code 202 may directly relate to Flowcode® 104. QR code 202 may be scanned. Server 206 may receive the scan. Server 206 may be a backend server. Server 206 may determine if QR code 202 is an intelligent redirect QR code. A QR code may be an intelligent redirect QR code, if the QR includes an intelligent redirect experiment node type. Upon determination that QR code 202 is an intelligent redirect QR code, server 206 may request a website variant from artificial intelligence or machine learning ("AI/ML") module 208.

AI/ML module 208 may serve out a website variant recommendation. The recommendation may be based upon the preconfigured algorithm. The recommendation may be based on a distribution pattern that may be updated dynamically. The recommendation may be created in real-time. AI/ML module 208 may dynamically recommend a website variant from the plurality of website variants. The recommended website variant and associated landing page may be transmitted to server 206. Server 206 may transmit the recommended website variant to mobile device 204. As such, the scanner may receive the URL or landing page on mobile device 204.

Figure 3:
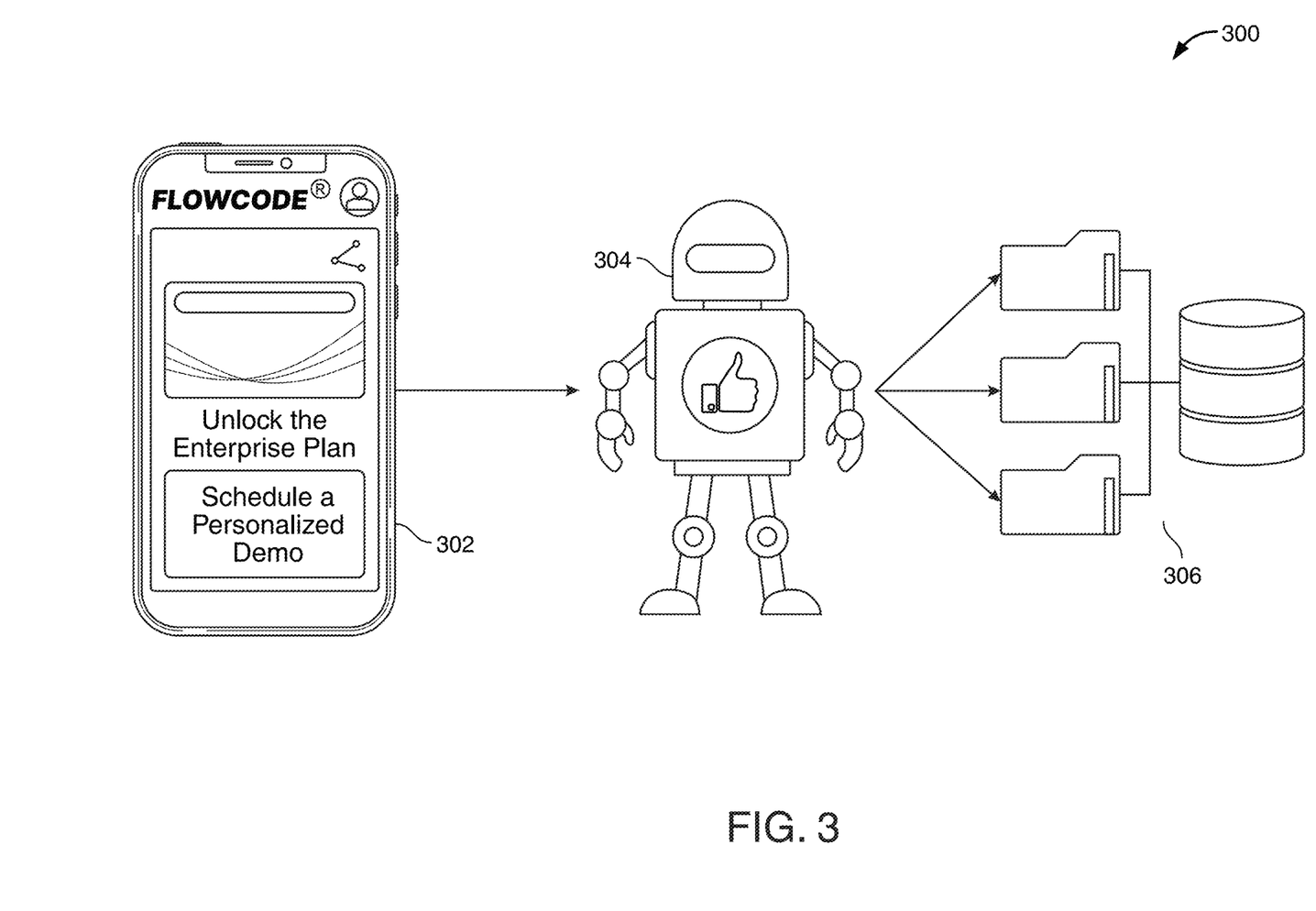
FIG. 3 shows an illustrative flow chart in accordance with principles of the disclosure.

FIG. 3 shows another illustrative flow diagram. Illustrative flow diagram 300 includes mobile device 302, AI/ML engine 304 and backend server and database 306. A scanner may receive a URL or landing page on mobile device 302. Mobile device 302 may directly relate to mobile device 204 shown in FIG. 2. Mobile device 302 may have scanned QR code 202. Mobile device 302 may be directed to a URL or landing page in response scanning the QR code.

There may be a front-end server included on mobile device 302. The front-end server may capture scanner behavior. Scanner behavior may include events and/or actions performed by the scanner, as well as data about the scanner. Events and/or actions may include a conversion action, an abandon event, an interaction event or any other suitable events or actions. The events and actions may be transmitted to AI/ML engine 304. AI/ML engine 304 may organize the events, actions and other suitable data in real time. AI/ML engine 304 may store the data in system 306. Storage of the data in system 306 may trigger a model retraining based on the scanner behavior. It should be noted that system 306, and the model retraining, may be shown in detail in FIG. 8 and described in the portion of the specification corresponding thereto.

Figure 4:
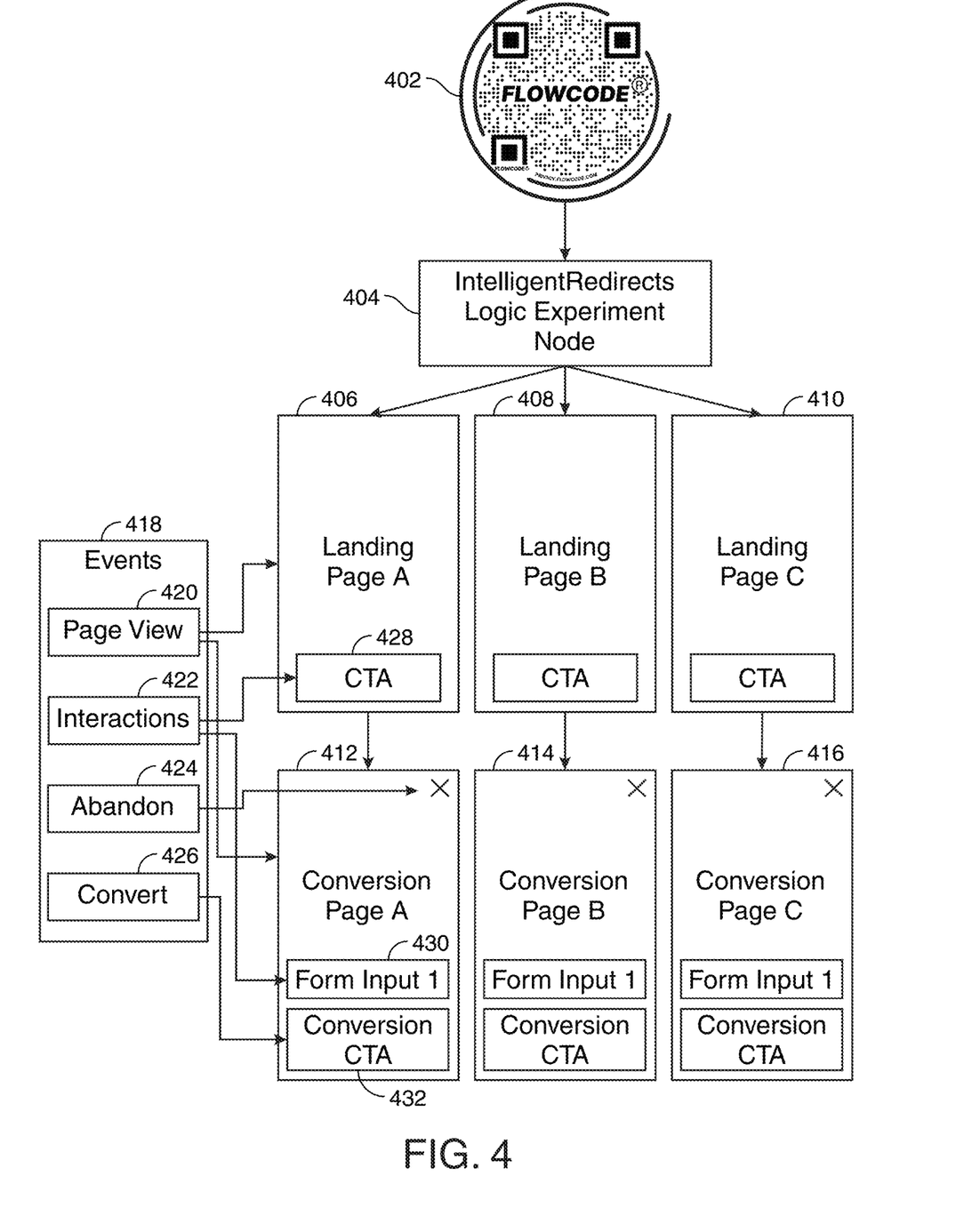
FIG. 4 shows an illustrative flow chart in accordance with principles of the disclosure.

FIG. 4 shows flow diagram 400. Flowcode® 402 may be scanned using a scanner device. The scanner device may be a mobile device, a computer, a smartwatch and/or any other suitable scanner device. A backend server may receive the QR code scan. The backend server may determine if the QR code is an intelligent redirects QR code. A QR code may be an intelligent redirects QR code if the code has an intelligent redirects Experiment Node. The QR code may be an intelligent redirect QR code, as shown at step 404.

Flowcode® 402 may retrieve one of a plurality of landing pages to route to the scanner. The landing pages may include landing page 406, landing page 408 and landing page 410. It should be noted that the QR code may be associated with any other number of landing pages. Each landing page may correspond to a website variant. There may be a plurality of website variants associated with each intelligent redirect QR code. It should be noted that landing page 406 and associated conversion page 412 are used to describe the process performed in the intelligent redirect system. However, any other suitable single page, landing page and/or conversion page may be used.

Each landing page may be associated with a website variant and conversion page. Landing page 406 may be associated with conversion page 412. Landing page 408 may be associated with conversion page 414. Landing page 410 may be associated with conversion page 416. A scanner may be directed from a landing page to a conversion page when a scanner selects or taps button 428.

Each scanner may receive a single landing page in response to a scan of the intelligent redirect QR code. The landing page may be associated with a website variant. A landing page and website variant may be selected from a plurality of landing pages and website variants based on a preconfigured algorithm. A landing page may be selected from a plurality of landing pages based on a new distribution pattern. In some embodiments, the preconfigured algorithm may be used during an initial stage of the intelligent redirects system. The AI engine may dynamically generate a new distribution pattern. In such embodiments, the new distribution pattern may be used during subsequent stages of the intelligent redirects system. The preconfigured algorithm and/or the new distribution pattern may be used to route the landing page and website variant to the scanner. The scanner may perform a Page View of the landing page.

The scanner may select and/or tap button 428 on landing page 406 or any other suitable landing page. A call to action ("CTA") may be embedded in button 428. When the user selects button 428, interaction event 422 is performed. Interaction event 422 may be stored as scanner behavior. The CTA is a component of landing page 406. When the scanner selects and/or taps button 428, the CTA may include Page View 420 of conversion page 412 or any other suitable conversion page. It should be noted that Page View 420 may include a Page View event. Page View event 420 may be stored as scanner behavior. It should be noted that when selecting button 428, the scanner may convert on a website variant with a particular CTA.

The scanner may perform Page View event 420 when conversion page 412 is viewed on the scanner device. The scanner may perform a plurality of actions and/or events on conversion page 412 or any other conversion page. Actions and/or events may include abandon event 424, conversion action 426, interactions event 422 or any other suitable action or event.

Convert 426, or conversion action 426, may be understood to refer to an action performed by the scanner that yields a conversion. A conversion, for purposes of this application, may include a successful user input submission on the conversion page. Such an action may include selecting or tapping conversion CTA 432.

Abandon event 424 may include an action in which the scanner ensures there will not be a completion of a conversion action. Such an action may include selecting the "X" on the corner of conversion page 412 or exiting conversion page 412 in any other suitable way.

Interactions event 422 may include an action performed by the scanner which is distinct from abandon 424 and convert 426. Such an action may include a Form Input 1 430 or any other suitable interaction event. Form Input 1 430 may include entering text in a form field or any other suitable input.

A scanner may perform one or more of Page View event 420, Interactions Event 422, Abandon Event 424, convert event 426 or any other suitable events. An AI engine may record each of the events performed by the scanner. The AI engine may generate and dynamically update a distribution pattern. The AI engine may aggregate scanner behavior for each website variant. The distribution pattern may be dynamically updated based on the scanner's behavior.

It should be noted that the distribution pattern may be based on events from a plurality of scanners. There may be a predetermined number of scanners and associated events recorded when creating the distribution pattern. The predetermined number of scanners may include 50, 100, 150, 200, 250 or any other suitable number of scanners and/or associated events.

It should be further noted that the distribution pattern may be dynamically updated from an aggregation of a plurality of scanners and a group or consort of scanner behaviors. An artificial intelligence ("AI") model or engine may aggregate the plurality of scanners and scanner behaviors. A dynamic conversion rate table may be built with respect to a location from where the code has been scanned or according to other data, metric and/or identifier. A dynamic conversion rate table may be built with respect to a plurality of scanner behaviors. The AI engine may leverage the dynamic conversion rate table to dynamically update the distribution pattern.

Figure 5:
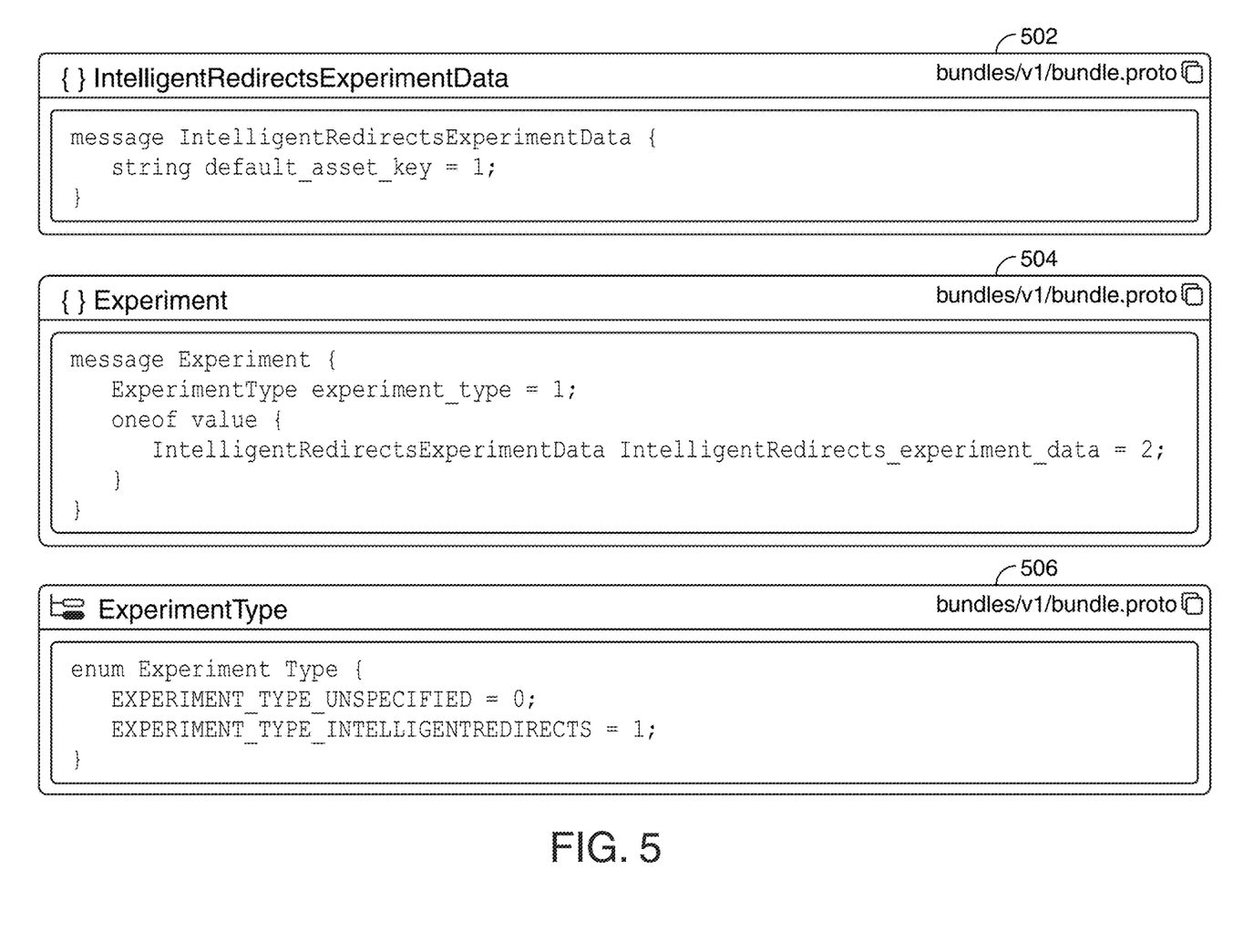
FIG. 5 shows an illustrative diagram in accordance with principles of the disclosure.

FIG. 5 is an illustrative diagram. Code elements 502, 504 and 506 are shown. Code elements 502, 504 and 506 may be protocol buffers. A protocol buffer may be a language-neutral, platform-neutral extensible mechanism for serializing structured data. The term "call", in computer programming, may be understood to refer to making a reference in the code to a predetermined function that is written elsewhere and instructing a program to execute the predetermined function.

Protos may be a definition language for protocol buffers. Protocol buffers may provide a serialization format for packets of information. Proto files may end in ".proto". In the .proto definition files, a developer may construct type, structured data definitions that may be used to pack and unpack data throughout an event streaming process.

The primary structural element of a proto definition may be the message declaration. Each message may encapsulate a cohesive data structure composed on identified fields. Each field may be associated with a specific data type. An exemplary message structure may include the following:

message MyMessage {
    int32 id=1;
    string name=2

Fields within a message may be assigned specific types (e.g. integers, strings, enumerations) and unique numeric identifiers. The identifier number may be unique within the message scope, because the identifier number functions as an unambiguous reference for field serialization. The numeric identifier may be used to maintain order in the serialization format and may not be a default value for the field.

Figure 6:
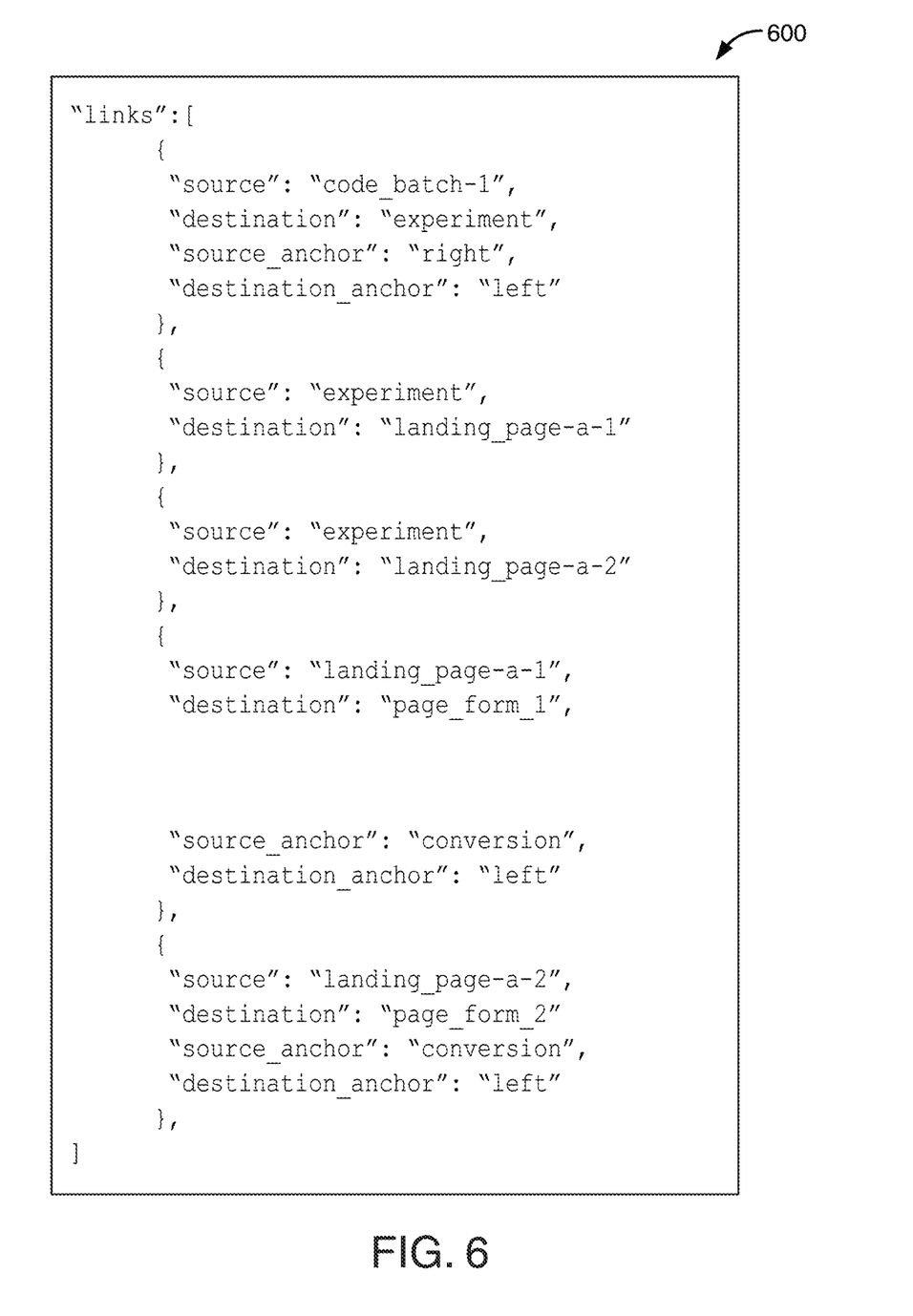
FIG. 6 shows an illustrative diagram in accordance with principles of the disclosure.

FIG. 6 shows an illustrative diagram. The illustrative diagram includes a code element 600. A portion of a bundle, also referred to as links, is shown at code element 600. Code element 600 may define a portion of one or more bundle links. Code element 600 may include a source and associated destination. A source and associated destination may also include a source anchor and/or a destination anchor.

As shown in code element 600, a first source may be code_batch-1. The associated destination for code_batch-1 may be experiment. The source anchor for code_batch-1 may be right. The destination anchor for experiment may be left.

As shown in code element 600, a second source may be experiment. The associated destination for experiment may be landing_page-a-1.

As shown in code element 600, a third source may also be experiment. The associated destination for experiment may be landing_page-a-2.

It should be noted that the second source and the third source may be identical. However, the destination associated with the second source and third source may be different. As such, a scanner may be directed to a different destination, such as landing page a-1 or landing page a 2, even if the selected source is the same. This may be in order to vary the destination from a single source. There may be one or more selection or assignment algorithms that determine which destination is assigned when a scanner selects the source identified as the second source or the third source.

As shown in code element 600, a fourth source may be landing_page-a-1. The associated destination with landing_page-a-1 may be page_form_1.

The source anchor for source landing_page-a-1 may be conversion. The destination anchor associated with destination page_form_1 may be left.

As shown in code element 600, a fifth source may be landing_page-a-2. The destination associated with landing_page-a-2 may be page_form_2. The source anchor associated with source landing_page-a-2 may be conversion. The destination anchor associated with destination page_form_2 may be left.

Figure 7:
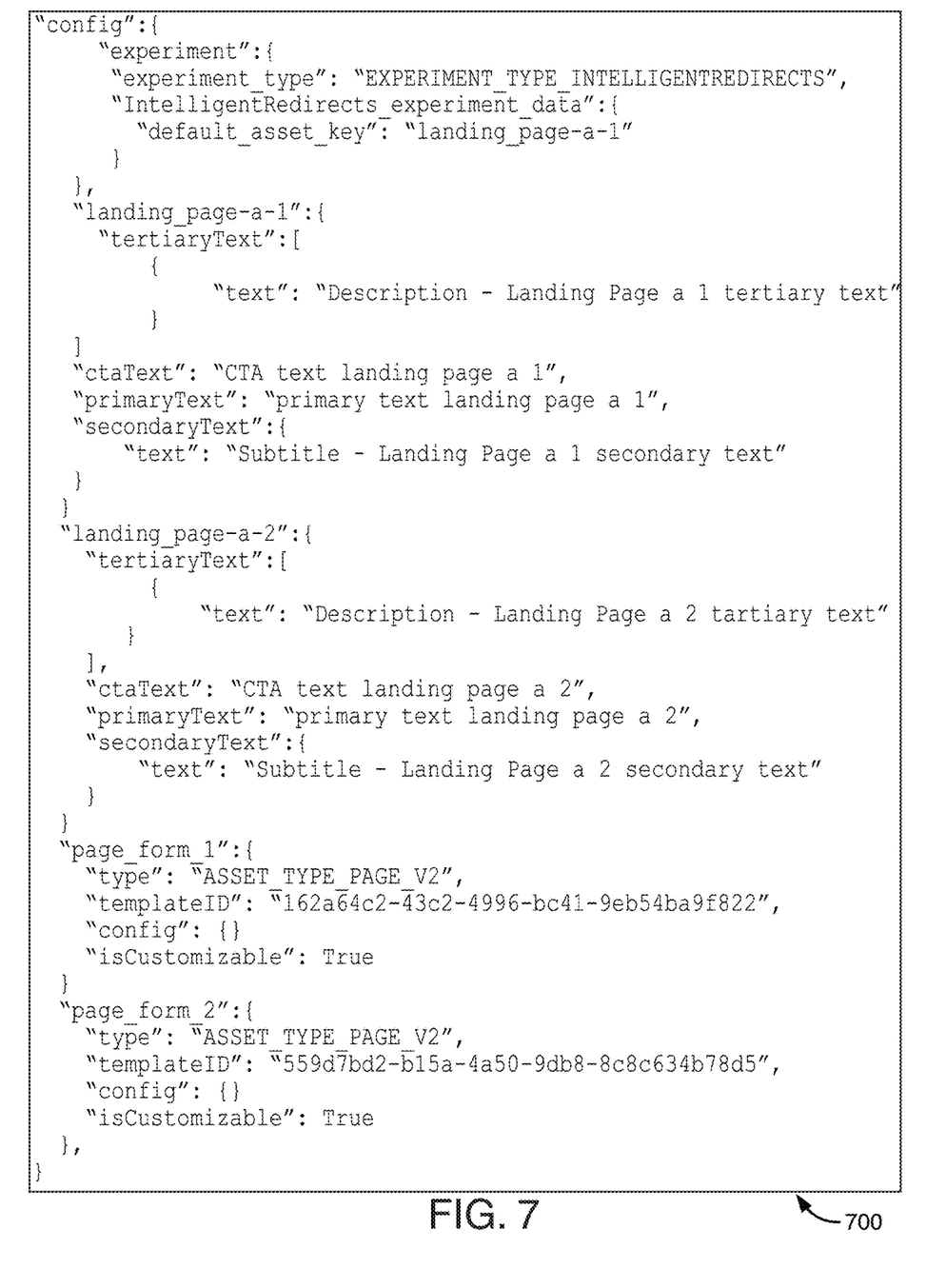
FIG. 7 shows an illustrative diagram in accordance with principles of the disclosure.

FIG. 7 shows an illustrative diagram. Illustrative diagram includes code segment 700. A bundle may be a template. Once a bundle is instantiated, a suite configuration may be identified. A portion of the bundle, also referred to as asset configs of the bundle, is shown at 700. The suite configuration may be a flow. The suite configuration may be shown within code segment 700.

It should be noted that the value of each of the tags, variables and other suitable objects within the configuration file and/or any other code element or file may be changed for different use cases and for any other suitable purpose. Furthermore, the values shown may be text values, or any other suitable values.

The suite configuration may include an experiment. The experiment may include an experiment type. The experiment type may be EXPERIMENT_TYPE_INTELLIGENTREDIRECTS. The experiment may also include an IntelligentRedirects_experiment_data. The IntelligentRedirects_experiment_data may be assigned a default_asset_key. The default_asset_key may be assigned landing_page-a-1.

Landing_page-a-1 may include a tertiaryText. The tertiaryText may include a text value. The text value may be Description—Landing Page a 1 tertiary text. It should be noted that the ML recommendation engine can use the primary, secondary and tertiary text to differentiate between text placement options on variants.

The configuration file may also include a ctaText tag. The ctaText tag may be assigned the value CTA text landing page a 1.

The configuration file may also include a primaryText tag. The primaryText tag may be assigned the value primary text landing page a 1. The configuration file may also include a secondaryText object. The secondaryText object may be assigned a text value. The text value may be Subtitle-Landing page a 1 secondary text.

Landing page a 1 may be the default landing page (the landing page initially called) when the default asset key is assigned to landing page a 1. However, the default asset key may be changed to landing page a 2. Additionally, when the default landing page is not called, for example, if there is a rotation between selected landing pages or if the default landing page is unavailable, a secondary or tertiary landing page may be called. As such, landing page a 2 may be called.

Page forms 1 and 2 may also be included within the configuration file. Page form 1 may include a type tag, template identifier tag, configuration tag and isCustomizable tag. The type tag may include the type of the page form. The template identifier may include an identification number associated with the page form. The template identifier may be used to identify and select the page form (or URL). The configuration tag may be shown as a null tag. However, the configuration tag may be updated at a different time. The isCustomizable tag may be a tag that indicates whether the page form is customizable or is not customizable. As shown, the page form 1 may be customizable because the isCustomizable tag may be set to True.

Page form 2 may include a type tag, a template identifier tag, a configuration tag and an isCustomizable tag. The type tag may include the type of the page form. The template identifier may include an identification number associated with the page form. The template identifier may be used to identify and select the page form (or URL). The configuration tag may be shown as a null tag. However, the configuration tag may be updated at a different time. The isCustomizable tag may be a tag that indicates whether the page form is customizable or is not customizable. As shown, the page form 2 may be customizable because the isCustomizable tag may be set to True.

Figure 8:
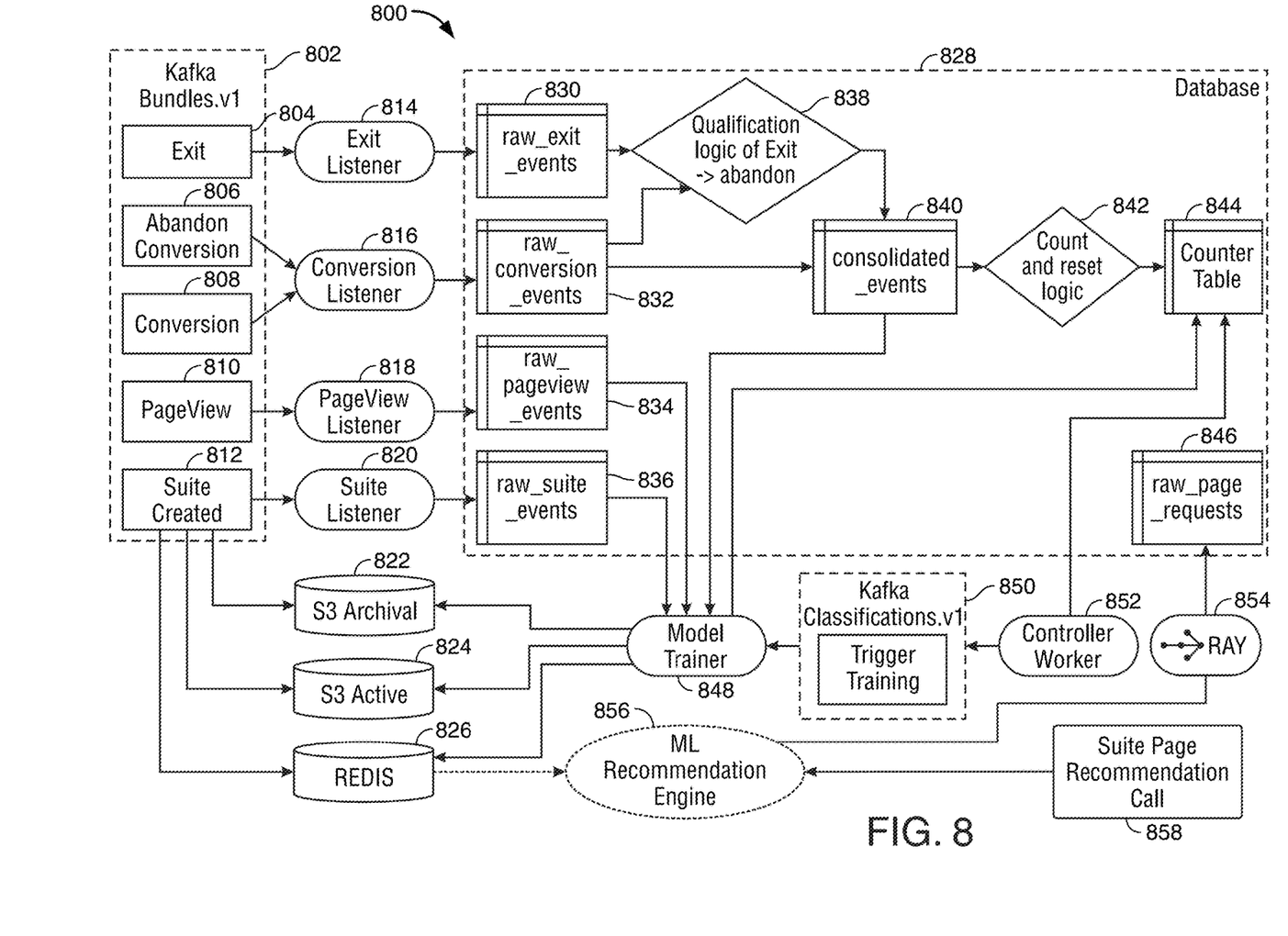
FIG. 8 shows an illustrative flow chart in accordance with principles of the disclosure.

FIG. 8 shows an illustrative flow diagram. Diagram 800 represents architecture extant on an Artificial Intelligence and/or Machine Learning ("AI/ML") engine. The AI/ML engine may be customized for use with intelligent redirect QR codes. The AI/ML engine may be the backend of an intelligent redirects system. The AI/ML engine may consume and create results based on data received from scanner devices scanning the intelligent redirect QR code.

A scanner may scan a QR code. The QR code may be an intelligent redirect QR code. A backend server may request a response from the artificial intelligence or machine learning ("AI/ML") engine. The AI/ML engine may generate a response with a specific reference that may indicate which landing page to route to the scanner. Upon a Page View event of the landing page on the mobile device, the scanner may perform one or more events. The one or more events may be transmitted to the backend server.

There may be a plurality of scanners scanning a single QR code. Each of the plurality of scanners may be directed to a landing page from the AI/ML engine. The plurality of scanners may perform actions and/or events in response to being directed to the landing page. Data stream 802 may receive the plurality of events and/or actions.

A scanner may view the landing page and/or conversion page. Such an event or events may be Page View 810. A scanner may exit the landing page received. Such an event may be Exit 804. A scanner may perform a conversion of the landing page received. The scanner may abandon the conversion page. Such an event may be Abandon Conversion 806. A scanner may perform a conversion of the landing page received. The scanner may use the conversion page. Such an event may be Conversion 808.

A user may, when transmitting the website variants to the backend server, create a suite for each of the website variants. It should be noted that only a user may create a suite. When a scanner performs specific events or actions on the landing page or conversion page, the suite may be used. Such an event may be a conversion.

Diagram 800 may include writers. The writers may listen to the data stream 802 for specific events. Writers may include exit listener 814, conversion listener 816, pageview listener 818 and suite listener 820. Exit listener 814 may listen for exit events. Conversion listener 816 may listen for conversion events and abandon conversion events. Pageview listener 818 may listen for pageview events. Suite listener 820 may listen for suite created events. It should be noted that suite created events are events created by the user, while each of the other events are events performed by the scanner.

In suite created event 812, a suite may be created. The suite may be stored in S3 Archival 822. The suite may also be stored in S3 Active 824. The suite may further be stored in REDIS 826. Redis 826 is a source-available, in-memory storage, used as a distributed, in memory key-value database, cache and message broker, with optional durability. Redis 826 may perform memory caching for recommendation service. Redis 826 allows caching the latest trained version of the model as a byte-array. S3 Archival 822 and S3 Active 824 may maintain a record of model versions that may have been trained as the usage data accumulates during the lifetime of a campaign. A campaign, for purposes of the application, may include trigger training and adjusting recommendations in real-time based on the events and conversions.

The preconfigured algorithm may be reconfigured based on each new campaign or even during a campaign. As such, the preconfigured algorithm may be dynamically adjusted with a new distribution pattern. In response to reconfiguring the algorithm, a highest-ranking website variant may be presented.

The writers may write the events in database 828. Database 828 may be a tabular application database. Database 828 enables storage of raw events objects from the front end. The raw events objects may be raw exit events object 830, raw conversion events object 832, raw pageview events object 834 and raw suite events object 836. Database 828 may further perform calculations to trigger training cycles through user defined functions ("UDF"'s) and database triggers.

Raw exit events object 830 may be ingested into decision 838. Decision 838 may be a qualification logic of exit decision. Decision 838 may determine whether the exit events in raw exit events object 830 are valid. If decision 838 decides any of the exit events valid, the valid exit events may be stored in consolidated events object 840. If decision 838 decides any of the exit events are not valid, decision 838 may obliterate the exit events determined as not valid.

Raw conversion events object 832 may include conversion events and abandon conversion events. The conversion events may be ingested by consolidated events object 840. The abandon conversion events may be ingested into decision 838. Decision 838 may determine whether the abandon conversion events are valid. If decision 838 decides any of the abandon conversion events as valid, the abandon conversion events may be ingested by consolidated events object 840. If decision 838 decides any of the abandon conversion events as not valid, decision 838 may obliterate the abandon conversion events determined as not valid.

Consolidated events object 840 may include valid exit events, valid abandon conversion events and conversion events. Consolidated events object 840 may be a merge of all valid events into a single object. Model trainer 848 may ingest consolidated events object 840. Count and reset logic decision 842 may ingest consolidated events object 840.

Count and reset logic decision 842 may count the consolidated events ingested. Count and reset logic decision 842 may transmit the number of the consolidated events to counter table 844. Diagram 800 may be used a plurality of times. Each time diagram 800 is used, count and reset logic decision 842 may reset to zero. As such, upon each new use and input of consolidated events count and reset logic decision 842 may be reset.

Controller worker 852 may emit a retrain decision to a machine learning ("ML") algorithm, or the new distribution pattern, to determine an appropriate recommendation. The recommendation may be to suggest a suitable website variant for a scanner. Based on the events, AI engine 800 may determine which website variant is suitable to transmit to a scanner device in response to a scan of the intelligent redirect QR code.

Controller worker 852 may create worker entities to execute the requests received. A worker entity may include Kafka Classifications.v1 850. Kafka is a distributed event streaming platform. It may be designed to handle high-throughput, real-time data feeds. Kafka may enable publishing, storing, and processing of streams of records in a fault-tolerant and horizontally scalable way. Kafka may be used for building data pipelines, streaming analytics and integrating data across different applications by enabling asynchronous, decoupled communication between systems.

Kafka Classifications.v1 850 may act as a funnel to carry over data from controller 852 to retrain model trainer 848 on which action must be taken by the workers. As such, upon implementation of a new campaign, or trigger training, Kafka Classifications.v1 850 may be triggered. Kafka Classifications.v1 850 may trigger a new training campaign as data is received.

A worker entity may include model trainer 848. Model trainer 848 may ingest consolidated events 840, raw pageview events object 834 and raw suite events object 836. Model trainer 848 may feed a machine learning ("ML") algorithm with data. The data may be the ingested data. The data may be the ingested raw events. Model trainer 848 may identify and/or learn appropriate values from the ingested data. Model trainer 848 may train the ML algorithm based on the appropriate values.

The ML algorithm and appropriate values may be stored in S3 Archival 822. S3 Archival 822 may maintain a record of model versions that may have been trained as the usage data may accumulate during the lifetime of a campaign. The ML algorithm and appropriate values may be stored in S3 Active 824. S3 Active 824 may maintain a record of model versions that may have been trained. The model versions may have been trained as the usage data accumulates during the lifetime of a campaign. S3 Archival 822 and S3 Active 824 may store the ML algorithm and appropriate values.

The ML algorithm and appropriate values may be transmitted to REDIS 826. Redis 826 may perform memory caching for recommendation service. Redis 826 allows caching the latest trained version of the model as a bytearray. Metadata, such as data counts, timestamps, etc. may be stored in counter table 844. Counter table 844 may include the number of each of the events.

Machine Learning ("ML") recommendation engine 856 may recommend a website variant from a plurality of website variants to be sent to a scanner. ML recommendation engine 856 may inject suite specific events from Redis 826. ML recommendation engine 856 may generate a recommendation based on the injected suite specific events.

ML recommendation engine 856 may transmit the recommended response to the scanner. Upon transmitting the recommended response to the scanner, ML recommendation engine 856 may dispatch a task to RAY 854. RAY 854 may log and store the request and response to raw page request object 846.

Raw page requests object 846, part of database 828, may receive the recommendations from Ray 854. Raw page requests object 846 may log requests and recommendations that have been served out by the recommendation engine. Raw page requests object 846 may be updated with each campaign.

A second scanner may scan an intelligent redirect QR code. The scan may be transmitted to system 800. A request for a suite page may be placed. System 800 may call a recommended suite page, as shown at 858, from ML recommendation engine 856. ML recommendation engine 856 may transmit the recommendation, that was served out in response to a request, to RAY 854. The recommendation may be a suite page. Raw page request object 846 may log and store the request and the recommended suite pages. As such, the request and responses may be used in the future.

As each scanner performs a conversion on the recommended suite page, system 800 may listen to the scanner's events performed on the suite page. System 800 may use the data retrieved from the scanner events to recommend suite pages and associated websites to additional scanners.

It should be noted that system 800 may create a new campaign, including new trigger training, upon receipt of a predetermined number of scans and associated events. The predetermined number of scans may be 5, 10, 20, 50, 100, 200, 500, 1000 or any other suitable number of scans. System 800 may create a recommendation based on the received scans and events.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Thus, apparatus and methods for intelligent redirects are provided. Persons skilled in the art will appreciate that the present invention can be practiced by other than the described embodiments, which are presented for purposes of illustration rather than of limitation.

What is claimed is:

1. A method for optimizing redirect for a quick response ("QR") code derived unified resource location ("URL"), said redirect comprising selecting a single website from among a plurality of websites as a target landing URL in response to a selection of the URL, the method comprising:
   receiving from a user a plurality of website variants, each of said website variants that presents an alternative landing page, each of the alternative landing pages corresponding to the QR code;
   receiving a plurality of scans of the QR code, each of said scans that navigates a scanner to one of the website variants, said one of the website variants being determined based on a preconfigured algorithm;
   deriving scanner behavior for each of the website variants;
   at an artificial intelligence ("AI") engine, determining a new distribution pattern, said determining based on an aggregate of scanner behaviors with scanner conversions, said new distribution pattern for distributing the website variants;
   ordering the website variants based on the new distribution pattern; and
   reconfiguring the algorithm based on the new distribution pattern to present, in response to a scan, a highest-ranking website variant based on the reconfiguration.

2. The method of claim 1 wherein the scanner behavior further comprises a time of day the QR code has been scanned.

3. The method of claim 1 wherein the scanner behavior further comprises a season during which the QR code has been scanned.

4. The method of claim 1 wherein the scanner behavior further comprises an event at which the QR code has been scanned.

5. The method of claim 1 wherein the scanner behavior further comprises a location from where the code has been scanned.

6. The method of claim 1 wherein the AI engine minimizes the website variants based on the new distribution pattern.

7. The method of claim 1 wherein the aggregate of scanner behavior is derived using a message brokering or data streaming system.

8. The method of claim 1 wherein the preconfigured algorithm is reconfigured in real-time as each of the plurality of scans and associated events are received.

9. The method of claim 1 wherein, based on the new distribution pattern, the AI engine is configured to navigate the scanner to a specific website variant.

10. An intelligent redirect system for a quick response ("QR") code derived unified resource location ("URL"), said intelligent redirect system comprising selecting a single website from among a plurality of websites as a target landing URL in response to a selection of the URL, the intelligent redirect system comprising:
    a plurality of website variants, each of the website variants that presents an alternative landing page, each of the alternative landing pages corresponding to the QR code;
    a backend server, said backend server for receiving, from a user, the plurality of website variants;
    the QR code;
    a plurality of scans of the QR code, each of said scans that directs a scanner to one of the website variants;
    a preconfigured algorithm, the preconfigured algorithm for determining a website variant to direct to the scanner;
    a processor, the processor configured to:
      derive scanner behavior for each of the website variants, said scanner behavior comprising scanner conversions; and
    an artificial intelligence ("AI") model, the AI model configured to:
      determine a new distribution pattern, said determine based on the derived scanner behavior, said new distribution pattern corresponding to an aggregate of scanner behaviors with scanner conversions;
      order the website variants based on the new distribution pattern; and
      reconfigure the algorithm based on the new distribution pattern to present, in response to a scan, a highest-ranking website variant based on the reconfiguration.

11. The system of claim 10 wherein the scanner behavior further comprises a time of day the QR code has been scanned.

12. The system of claim 10 wherein the scanner behavior further comprises a season during which the code has been scanned.

13. The system of claim 10 wherein the scanner behavior further comprises an event at which the code has been scanned.

14. The system of claim 10 wherein the scanner behavior further comprises a location from where the code has been scanned.

15. The system of claim 10 wherein the AI model minimizes the website variants based on the new distribution pattern.

16. The system of claim 10 wherein the aggregate of scanner behavior is derived using a message brokering or data streaming system.

17. The system of claim 10 wherein the preconfigured algorithm is reconfigured in real-time as each of the plurality of scans and associated events are received.

18. The system of claim 10 wherein, based on the new distribution pattern, the AI engine is configured to navigate the scanner to a specific website variant.

\* \* \* \* \*